March 31, 1953  J. M. MARSHALL  2,633,363
ABUTMENT ASCENDING HAND TRUCK
Filed Nov. 20, 1948
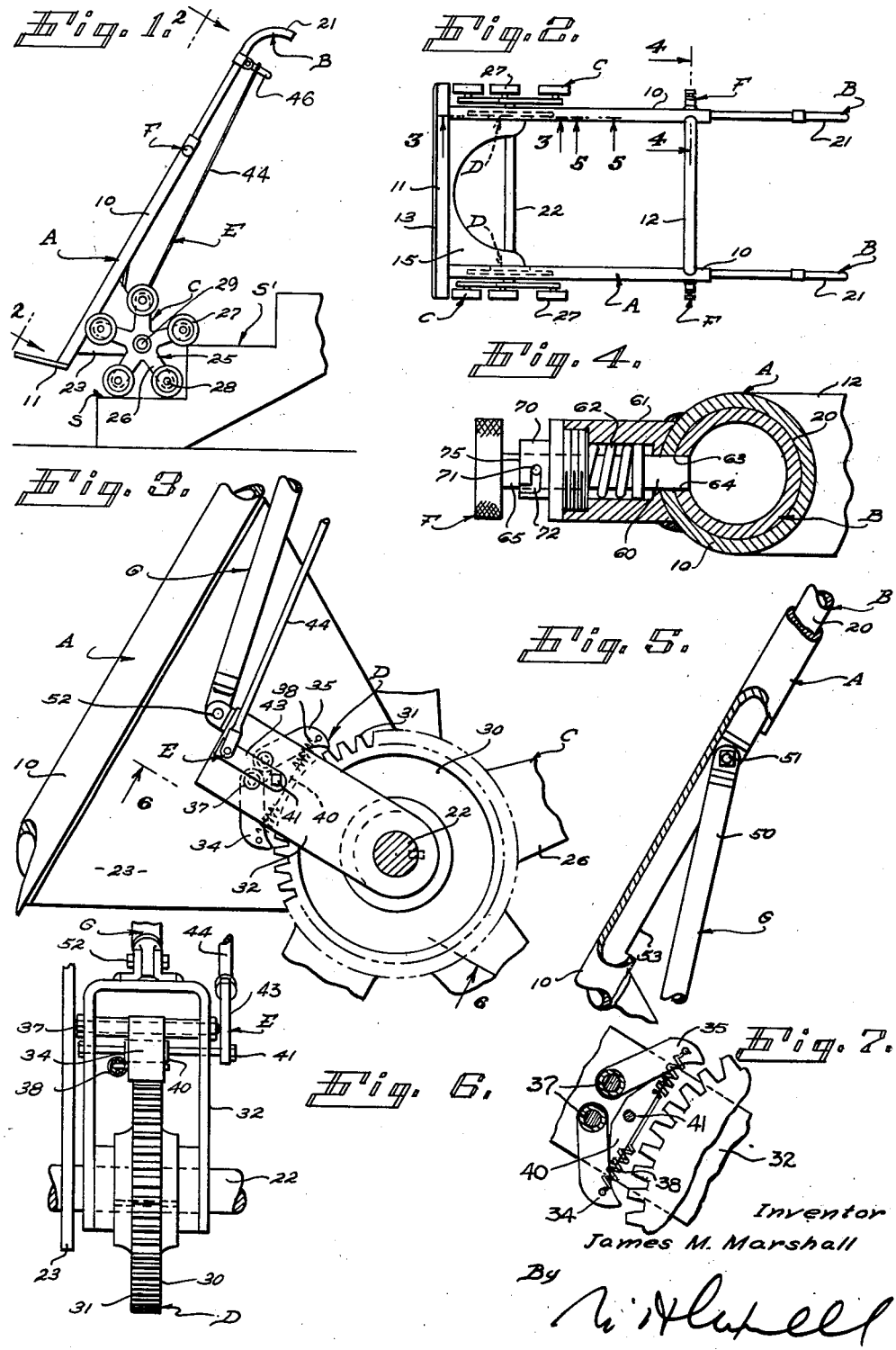
Inventor
James M. Marshall
By
Attorney Patented Mar. 31, 1953

2,633,363

UNITED STATES PATENT OFFICE 2,633,363

ABUTMENT ASCENDING HAND TRUCK

James M. Marshall, Long Beach, Calif., assignor of one-third to Walker D. McMahan and one-third to Frank L. Rogers, both of Long Beach, Calif.

Application November 20, 1948, Serial No. 61,153

12 Claims. (Cl. 280—5.26)

This invention has to do with a hand truck and it is an object of the invention to provide a structure that is simple, sturdy, and which may be easily operated over obstacles or up steps, or the like.

Hand trucks have long been used to handle heavy objects such as trunks, packing cases and the like, and the ordinary hand truck that involves merely a pair of wheels mounted on a platform or frame works satisfactory until an obstacle is encountered, or until the load has to be moved up or down steps, or the like. Proposals have been made to provide hand trucks for negotiating obstacles or steps. However, such devices as have been proposed have been more or less complicated, have involved intricate or complicated mechanisms, and have, for one reason or another, been generally impractical and unsatisfactory.

It is a general object of this invention to provide a hand truck that is provided with star wheels supporting the frame, and with grips operable relative to the frame and operatively connected with the wheels so that the truck can be advantageously operated over obstacles such as steps or the like.

Another object of this invention is to provide a mechanism of the general character referred to which involves but few simple sturdy and dependable parts. The mechanism of the present invention is such as to provide a satisfactory mechanical advantage between the grips and the star wheels which carry the supporting wheels by which easy operation is gained and yet the mechanism is free of complicated gear trains or other such devices.

A further object of this invention is to provide a structure of the general character referred to wherein easily and independently controlled reversible ratchets couple the grips and the unit involving the star wheels.

The various objects and features of my invention will be fully understood from the following detailed description of a typical preferred form and application of the invention, throughout which description reference is made to the accompanying drawings, in which:

Fig. 1 is a side elevation of the structure provided by the present invention showing it in position to operate over stairs. Fig. 2 is a plan or top view of the structure, being a view taken in the direction indicated by line 2—2 on Fig. 1. Fig. 3 is an enlarged detailed sectional view taken in the direction indicated by line 3—3 on Fig. 2, illustrating one of the ratchet units and showing it in a neutral position. Fig. 4 is an enlarged detailed sectional view taken as indicated by line 4—4 on Fig. 2. Fig. 5 is an enlarged detailed sectional view of a portion of the mechanism, being a view taken as indicated by line 5—5 on Fig. 2. Fig. 6 is a view taken in the direction indicated by line 6—6 on Fig. 3. Fig. 7 is an enlarged sectional view of the pawl mechanism shown in Fig. 3.

The structure provided by the present invention is particularly practical and useful as applied to a truck to be operated by hand and may be shaped and proportioned to advantageously handle trunks, packing cases, refrigerators and like objects, and it will therefore be described in such form.

The structure of the present invention involves, generally, a frame or body A, handles B on the frame shiftably related thereto, supporting means C carrying the frame and involving ground engaging wheels or rollers, reversible ratchet operating units D for actuating the supporting means C, control means E for reversing the ratchet units, lock means F acting to selectively set the handles against operation, and operating connections G between the handles and the ratchet units.

The frame or body A may vary widely in form and construction. In the preferred form of the invention illustrated in the drawings the frame is a simple, light, sturdy structure including or involving elongate side rails 10 and cross beams 11 and 12 extending between and connecting the rails. The rails 10 and the beams 11 and 12 combine to form a rigid rectangular structure, the cross beam 11 being a platelike part located at the forward or lower end of the frame where it extends between the ends of the rail 10 and has a projecting lip portion 13. Stiffening members or webs 15 are provided in the corners between the rails 10 and beam 11. The cross beam 12 is located between the upper or inner ends of the rails 10.

The rails 10 of the frame A are shown as simple straight tubular elements and in the case illustrated they are parallel with each other.

The handles B are carried by the upper or inner end portion of the frame A and in the preferred construction there are two individual or separate handles, one carried by each of the rails 10 of the frame A. In the preferred construction each handle B includes an elongate shank portion 20 slidably coupled to or engaged with a rail 10 of frame A and a grip 21 on the outer or projecting end portion of the shank. Where the rails 10 are tubular it is preferred that the shanks 20 slidably engage in the rails and the shanks are of such length as to have adequate bearing engagement in the rails. The grips 21 may be extensions or continuations of the shanks 20 bent or curved to present parts convenient to be grasped by the operator.

The supporting means C carrying frame A involves, generally, two like star wheels on the ends of a common axle 22 supported transversely of the frame A by brackets 23 that depend from the frame at the forward or lower end portion thereof. The brackets 23 are preferably fixed to the rails 10 of the frame so that they project a suitable distance downward therefrom and they may be provided with suitable bearing parts effectively supporting the axle 22 for free rotation.

The star wheels of the means C are fixed on the axle 22 and are alike, each star wheel involving a center or wheel portion 25 with a plurality of radially projecting arms 26 carrying supporting wheels or rollers 27. In the particular form of the invention illustrated each wheel 25 has five equally spaced radially projecting arms 26 and trunnions 28 project from the outer end portions of the arms 26 parallel with the axle 22 to rotatably support the wheels 27. The wheels 25 have hub portions 29 fixed or set on the axle 22 so that the two wheels 25 are in the same rotative position.

Since the structure provided by the present invention is intended for operation over an ordinary staircase or the like, it is preferred to space and proportion the parts of the star wheels so that when the star wheels are positioned with two supporting wheels 27 on one step S another supporting wheel is engaged with or ready to roll onto a second or next higher step S', as shown in Fig. 1 of the drawings. It will be apparent that with the supporting means C formed and constructed as above described and as shown throughout the drawings the structure will effectively operate either up or down over stairs or other obstacles such as boards, thresholds, etc. likely to be encountered during the course of operating the truck.

In accordance with the present invention there are two reversible ratchet operating units D included in the structure and each of the units D is connected with a handle B through an operating connection G. In the preferred arrangement the axle 22 extends through the supporting brackets 23 and the star wheels 25 are fixed on the ends of the axle at the outer sides of the brackets 23. The ratchet units D may be advantageously located on the axle at the inner sides or immediately inward of the brackets 23.

Each ratchet unit is shown as including a ratchet wheel 30 fixed on the axle 22 and having teeth 31. A pivoted operating or ratchet arm 32 is related to the ratchet wheel and carries oppositely faced pawls 34 and 35. In the preferred arrangement the arm 32 is pivotally carried on the axle 22 and is free to turn or swing relative to the axle and consequently relative to the wheel 30 which is fixed on the axle. The pawls are carried by pivot pins 37 provided on the arm 32 and they project in opposite directions around the peripheral portion of the wheel 30. Springs 38 are related or connected to the pawls 34 and 35 and normally tend to urge the pawls toward the wheel so that they cooperate with the teeth 31 thereof.

The control means E for each ratchet mechanism or unit D is shown as including a control head or cam 40 engaged with the pawls 34 and 35 and supported to rock or rotate so it can be positioned in such manner as to hold both pawls are carried by pivot pins 37 provided on 30, or to lower either of the pawls into engagement with the teeth of wheel 30 until the other pawl is lifted away from wheel 30. The cam 40 is shown carried on a rocker shaft 41 supported by arm 32 and an operating arm 43 projects from the shaft 41 and an operating rod 44 connects with the arm 43. In the preferred arrangement the operating rod 44 extends to the handle B which is coupled with the particular ratchet unit under consideration through a connecting means G. In the arrangement illustrated the connecting rod 44 extends to a point adjacent the grip of such handle where it is connected to a pivoted trigger or lever 46. By throwing the lever 46 in one direction or the other from the neutral position shown in Figs. 1 and 3 of the drawings either one or the other of the pawls may be engaged with the ratchet wheel. It is to be observed that the parts of the structure are related so that the handles B and units D move in unison leaving the position of lever 46 substantially undisturbed.

In the preferred arrangement of the invention where a ratchet unit D is located immediately inside of a bracket 23 projecting from one of the rails 10 of frame A that ratchet unit is connected with the handle B carried by that rail 10 through a connecting means G. In the preferred form of the invention the connecting means G is of simple construction and involves merely a connecting rod or link 50 having one end pivotally connected to the shank 20 of the handle by a pivot pin 51 while the other end is connected to the arm 32 of means D by pivot 52. The pivot pin 51 connects the connecting link 50 to the inner or lower end of the shank 20 which end of the shank is located within the rail 10. A lateral or side opening in the form of a slot 53 is provided in the rail 10 to pass the connecting link 50 from the shank to the arm 32.

A unit of the lock means F is provided to operate in connection with each handle B and serves to releasably secure the handle against movement relative to its supporting frame member 10. In the form illustrated in the drawings each unit of the lock means F involves a lock pin 60 slidably carried in a guide 61 projecting from the exterior of the rail 10 and a spring 62 normally yieldingly holds the pin in position where it extends through registering openings 63 and 64 in the rail and handle shank 20, respectively. A stem 65 projects from the pin 60 and a holder is provided in connection with the stem so that the structure may be set in position where the pin is out of engagement with the shank.

In the particular case illustrated the holder for the lock involves an extension 70 on the guide 61 and a pin 71 projecting laterally from the stem 65 and cooperating with a bayonet slot 72 in the extension 70. When the pin 71 is in the slot 72 as shown in Fig. 4 of the drawings, lock pin 60 is engaged, locking the handle shank 20 against movement relative to the rail 10. When the pin 71 has been moved through the slot 72 to rest or bear on the outer end 75 of extension 70 then the lock pin 60 is held out of engagement with the handle shank 20, leaving the handle free to be reciprocated relative to its supporting rail 10.

From the foregoing description it will be apparent that I have provided two separate ratchet mechanisms or units in connection with the star wheel support that carries the frame, and either one or both of the ratchet mechanisms can be operated, as conditions require.

When it is desired to operate the structure in a rigid condition or like an ordinary truck, for instance, on two wheels, and starting from a position where it is on four wheels, both units of lock means F may be set or engaged, fixing the handles against movement relative to the frame, and the two ratchet units may be set to check rotation of the star wheels by setting one to check rotation of the star wheels in one direction and the other to check rotation in the other direction. If the ratchet units are set with the handles either slightly above or below a normal working position movement of the handles to the normal working position puts two wheels in service. By releasing one of the ratchet units from the setting just described the star wheels are free to trip over obstacles when moving in one direction, or by releasing the other ratchet unit the wheels are free to trip over obstacles when moving in the other direction. By releasing all of the pawls the structure is released and is free to be operated on four wheels.

If an obstacle or a staircase is encountered as the truck is operated and it is desired to rotate the axle and thus operate the star wheels, the operator may release either one of the lock means F freeing a handle so that it can be pulled in such manner as to rotate the star wheel support while the other handle is held, steadying the structure. If desired the operator may release both units of lock means F and may simultaneously operate the handles B relative to the frame A so that force is applied from both handles, causing rotation of the support.

It will be apparent from the drawings that when pawls 35 are engaged with the ratchet wheels 30 through suitable operation of control means E outward movement or extension of the handles relative to the frame will rotate the supporting means in a clockwise direction and repeated reciprocation of the handles will cause ratcheting of the supporting means in that direction. If it is desired to rotate or to allow rotation of the supporting means C in a counterclockwise direction then the control or controls E are operated to engage pawls 34 with the ratchet wheels 30. With the pawls 34 engaged inward movement of the handles relative to the rails 10 causes operation of the support in a counterclockwise direction.

From the foregoing description and from the drawings it will be apparent how the handles being subject to reciprocation relative to the frame while the ratchet pawls are suitably set or operated enables the operator to manipulate the structure to advantage and to maintain satisfactory control over its operations or actions.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A hand truck including, an elongate frame, a handle carried by the frame to project from one end thereof and to reciprocate relative thereto, a star wheel support carrying the frame and located at the other end thereof, and a reversible ratchet driving connection between the handle and the support.

2. A hand truck including, an elongate frame, handles mounted to reciprocate relative to the frame and projecting from one end thereof, a support from the frame at the other end thereof and including a rotatable axle and star wheels fixed on the axle, each star wheel carrying a plurality of supporting rollers, ratchet means driving the axle, and connecting rods operatively connecting the handles and the ratchet means.

3. A hand truck including, a frame, handles mounted to reciprocate relative to the frame, a support from the frame including a rotatable axle and star wheels fixed on the axle, each star wheel carrying a plurality of supporting rollers, a reversible ratchet mechanism for each handle driving the axle, cam means controlling the ratchet mechanisms, and connecting rods operatively connecting the handles and said ratchet mechanisms.

4. A hand truck including, a frame having spaced tubular side rails, handles having shanks slidably carried in the rails and projecting therefrom and having grips on the projecting portions of the shanks, releasable lock means selectively holding said handles against movement relative to the frame, an axle rotatably supported on the frame, star wheels fixed on the axle and each having arms carrying rollers, a ratchet wheel on the axle for each handle, a ratchet arm for each ratchet wheel pivoted on the axle, pawls carried by the ratchet arms and cooperating with the ratchet wheels, and connecting rods connecting the shanks of the handles and the ratchet arms.

5. A hand truck including, a frame having spaced tubular side rails, handles having shanks slidably carried in the rails and projecting therefrom and having handles on the projecting portions of the shanks, releasable lock means for each handle holding the shank of the handle against movement relative to the frame, an axle rotatably supported on the frame, star wheels fixed on the axle and each having arms carrying supporting rollers, a ratchet wheel fixed on the axle for each handle, a ratchet arm pivoted on the axle adjacent each ratchet wheel, oppositely disposed pawls pivotally carried by each ratchet arm, means selectively controlling engagement of the pawls and a connecting rod between each ratchet arm and a handle shank.

6. A hand truck including, an elongate frame, a rotatable star wheel support carrying the frame and located at one end thereof, handles carried by the frame and projecting from the other end thereof, one of the handles being carried by the frame to reciprocate relative to the frame, and a mechanical drive adapted to rotate the star wheel support and including a reciprocating drive rod connected to the reciprocable handle and adapted to be operated thereby.

7. A hand truck including, an elongate frame, a rotatable star wheel support carrying the frame and located at one end thereof, handles carried by the frame and projecting from the other end thereof and being independently shiftable lengthwise thereof, and means operatively connecting each handle with the support including a pivoted member operating the support and a link between the pivoted member and the handle through which the pivoted member is rocked by shifting of the handle.

8. A hand truck including, an elongate frame having longitudinal tubular rails, handles slidably carried by the rails and projecting from one end of the frame, a support carrying the frame and including an axle rotatably mounted on the frame at the other end thereof, star wheels fixed on the axle, and supporting wheels carried by the star wheels, ratchet units on the axle, and a mechanical drive between each handle and one of the ratchet units whereby the axle is rotatable by operation of one or both of the handles relative to the frame.

9. A hand truck including, an elongate frame having longitudinal tubular rails, handles slidably carried by the rails and projecting from one end of the frame, a support carrying the frame and located at the other end thereof and including an axle rotatably mounted on the frame, star wheels fixed on the axle, and supporting wheels carried by the star wheels, ratchet units on the axle, each unit including a ratchet wheel fixed on the axle, an arm pivoted on the axle and a pawl carried by the arm and cooperating with the ratchet wheel, and links connecting the arms of the ratchet units and the handles by which the axle is rotatable by operation of one or both of the handles relative to the frame.

10. A hand truck including, an elongate frame, handles carried by the frame at one end thereof to reciprocate relative to the frame and in the direction thereof, a star wheel support carrying the frame and located at the other end thereof, and ratchet means operatively connecting the handles and the support whereby reciprocation of the handles causes rotation of the support.

11. A hand truck including, an elongate frame, handles carried by the frame at one end thereof to reciprocate relative to the frame and in the direction thereof, releasable lock means selectively holding the handles against movement relative to the frame, a star wheel support carrying the frame, and ratchet means operatively connecting the handles and the support whereby reciprocation of the handles causes rotation of the support.

12. A hand truck including, an elongate frame having spaced longitudinal tubular side rails, handles having shanks slidably engaged in the rails to reciprocate relative to the frame and having grips beyond the frame at one end of the frame, a star wheel support carrying the frame and located at the other end thereof, means operatively connecting the handles and the support whereby reciprocation of the handles causes rotation of the support, and lock means for each handle including a lock bolt engageable in registering openings in the shank of the handle and the rail carrying said shank.

JAMES M. MARSHALL.

REFERENCES CITED

The following references are of record in the file of this patent:

UNITED STATES PATENTS

| Number | Name | Date |
| --- | --- | --- |
| 1,042,193 | Bowling | Oct. 22, 1912 |
| 1,551,127 | Whyel | Aug. 25, 1925 |
| 2,400,824 | Jackson | May 21, 1946 |
| 2,418,665 | Rizzuto | Apr. 17, 1947 |
| 2,419,422 | Schulein | Apr. 22, 1947 |